P. K. CROWELL.
COTTON TRAMPER AND BALER.
APPLICATION FILED NOV. 5, 1913.

1,235,556.

Patented Aug. 7, 1917.
4 SHEETS—SHEET 2.

Witnesses:
E. C. Murphy
L. B. Weymouth

Inventor:
Pearl K. Crowell
By Henry J. Miller atty

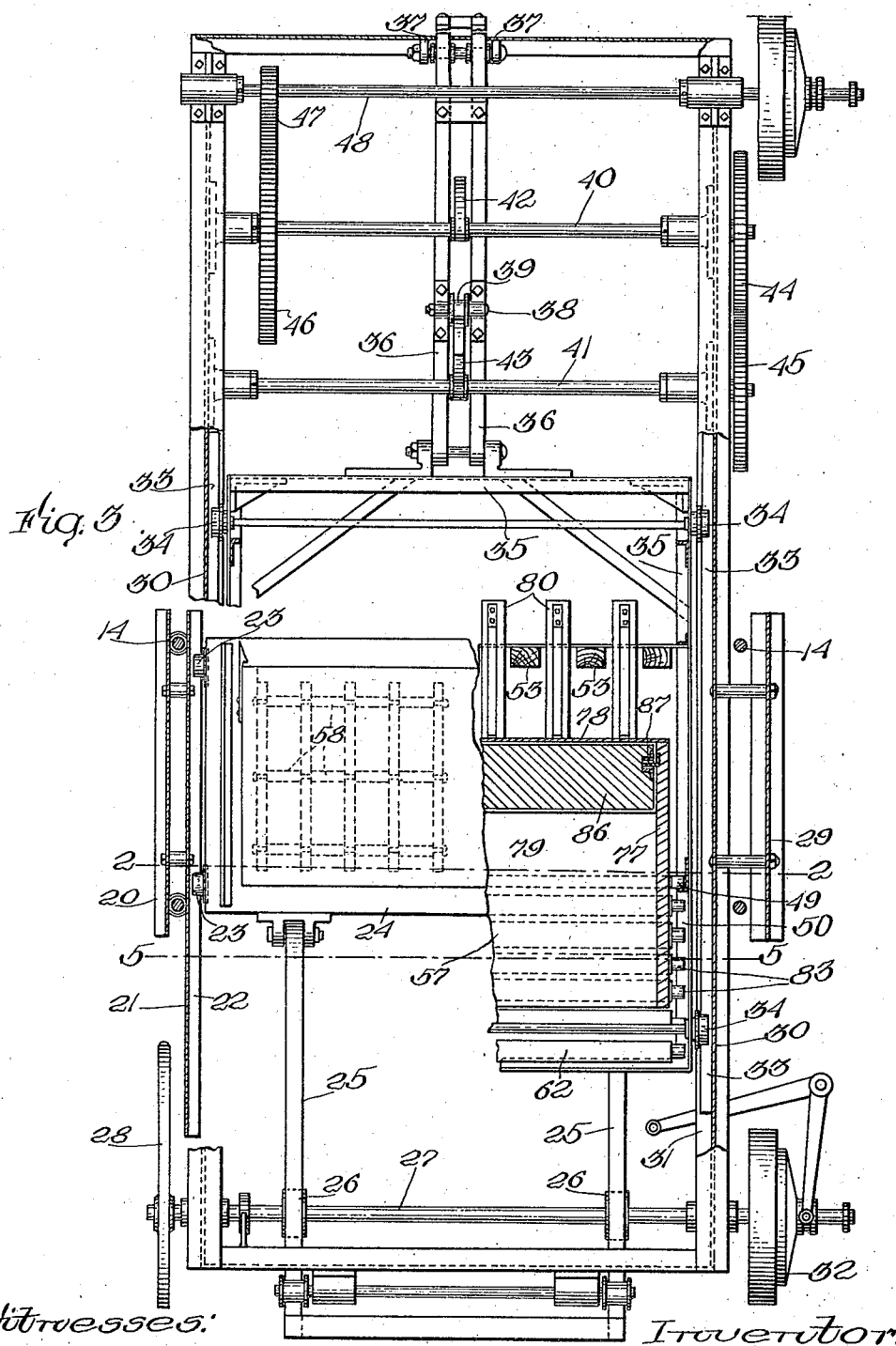

P. K. CROWELL.
COTTON TRAMPER AND BALER.
APPLICATION FILED NOV. 5, 1913.
1,235,556.
Patented Aug. 7, 1917.
4 SHEETS—SHEET 4.
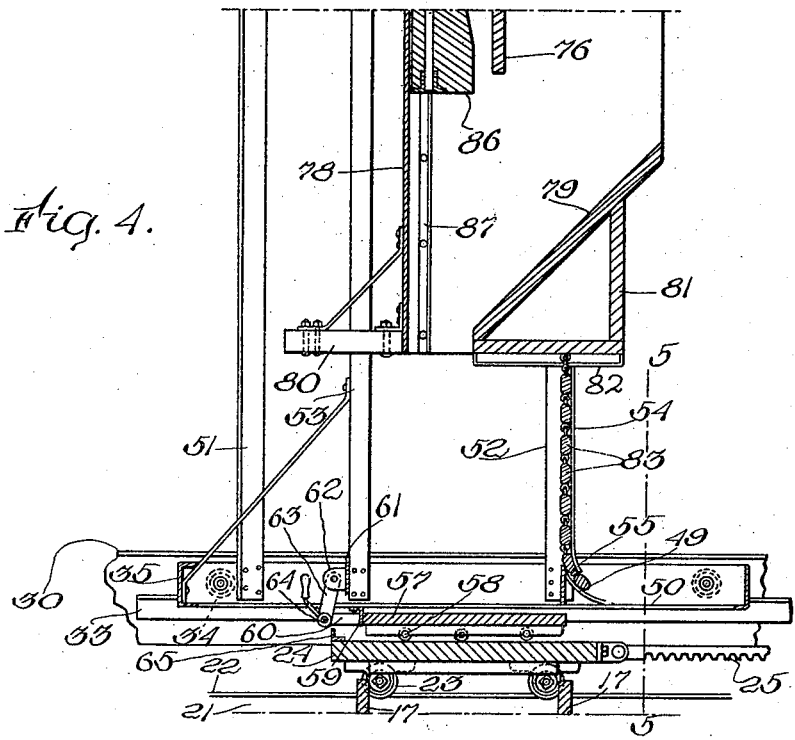
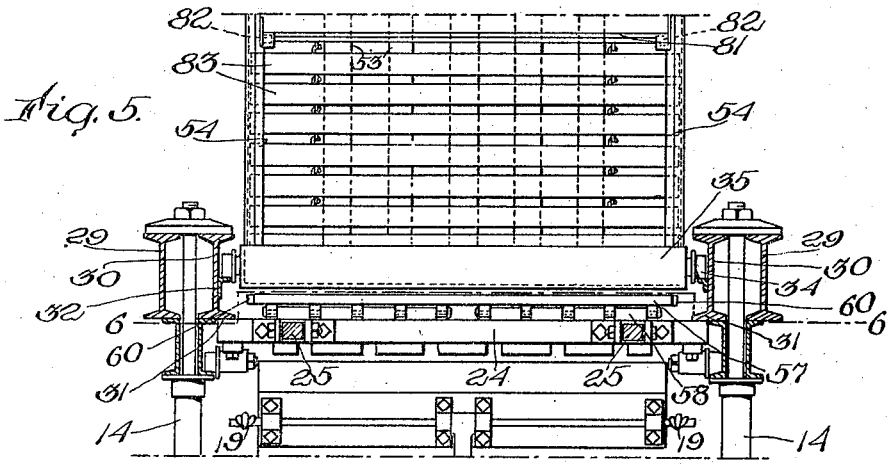
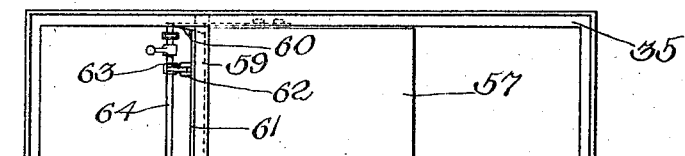
Witnesses:
E. C. Murphy.
L. B. Weymouth
Inventor:
Pearl K. Crowell.
By Henry J. Miller
Atty

UNITED STATES PATENT OFFICE.

PEARL K. CROWELL, OF SAN ANTONIO, TEXAS, ASSIGNOR OF ONE-HALF TO CHARLES H. FISH, OF BROOKLINE, MASSACHUSETTS.

COTTON TRAMPER AND BALER.

1,235,556. Specification of Letters Patent. Patented Aug. 7, 1917.

Application filed November 5, 1913. Serial No. 799,382.

*To all whom it may concern:*

Be it known that I, PEARL K. CROWELL, a citizen of the United States, residing at San Antonio, in the county of Bexar and State of Texas, have invented new and useful Improved Cotton Trampers and Balers, of which the following is a specification, reference being had to the accompanying drawings, forming part thereof.

This invention has reference to improvements in machines for pressing cotton lint into approximate shape for bales and for compressing said pressed cotton to ultimately form a bale thereof convenient for handling and shipping.

One object of the invention is to provide mechanism whereby cotton, usually lint cotton, may be supplied continuously from any ordinary cotton condenser, feeder or similar means and progressively tamped or tramped to more effectually drive out the air from the cotton lint than heretofore.

Another object of the invention is to so construct a preliminary cotton tramper and presser and an ultimate cotton baler that the partially pressed cotton may be delivered or transferred from the preliminary machine to the ultimate machine without handling the same and in which the cotton tramper is adapted to assist in such transfer.

Another object of the invention is to so construct a cotton tramper box for a cotton baler that the cotton lint is continuously delivered at the point at which it is to be tramped and is confined at the sides in the progressive formation of the preliminary or tramped bale.

Another object of the invention is to so construct a combined cotton tramper and baler or compressor that the tramped cotton or preliminary bale may be delivered vertically into the bale compressor and that the weight of the cotton may assist in such movement of the preliminary bale.

Other objects of the invention will appear from the following description.

The invention consists in the combined tramper and baler hereinafter described and claimed.

Fig. 3, represents an enlarged cross sectional plan view as taken on line 3—3 Fig. 2, some of the parts being omitted.

Fig. 4, represents an enlarged sectional detail view taken on line 1—1 Fig. 2 to show more clearly the details of construction and to show the tramper mechanism and some of its associated parts as moved upward.

Fig. 5, represents an enlarged sectional detail view taken on line 5—5 Fig. 4 some of the parts being omitted to show details of other parts.

Fig. 6, represents a plan view of the platen and some of its related parts as taken on line 6—6, Fig. 5, showing details of the latching device.

Similar characters of reference designate corresponding parts throughout.

Figure 1:
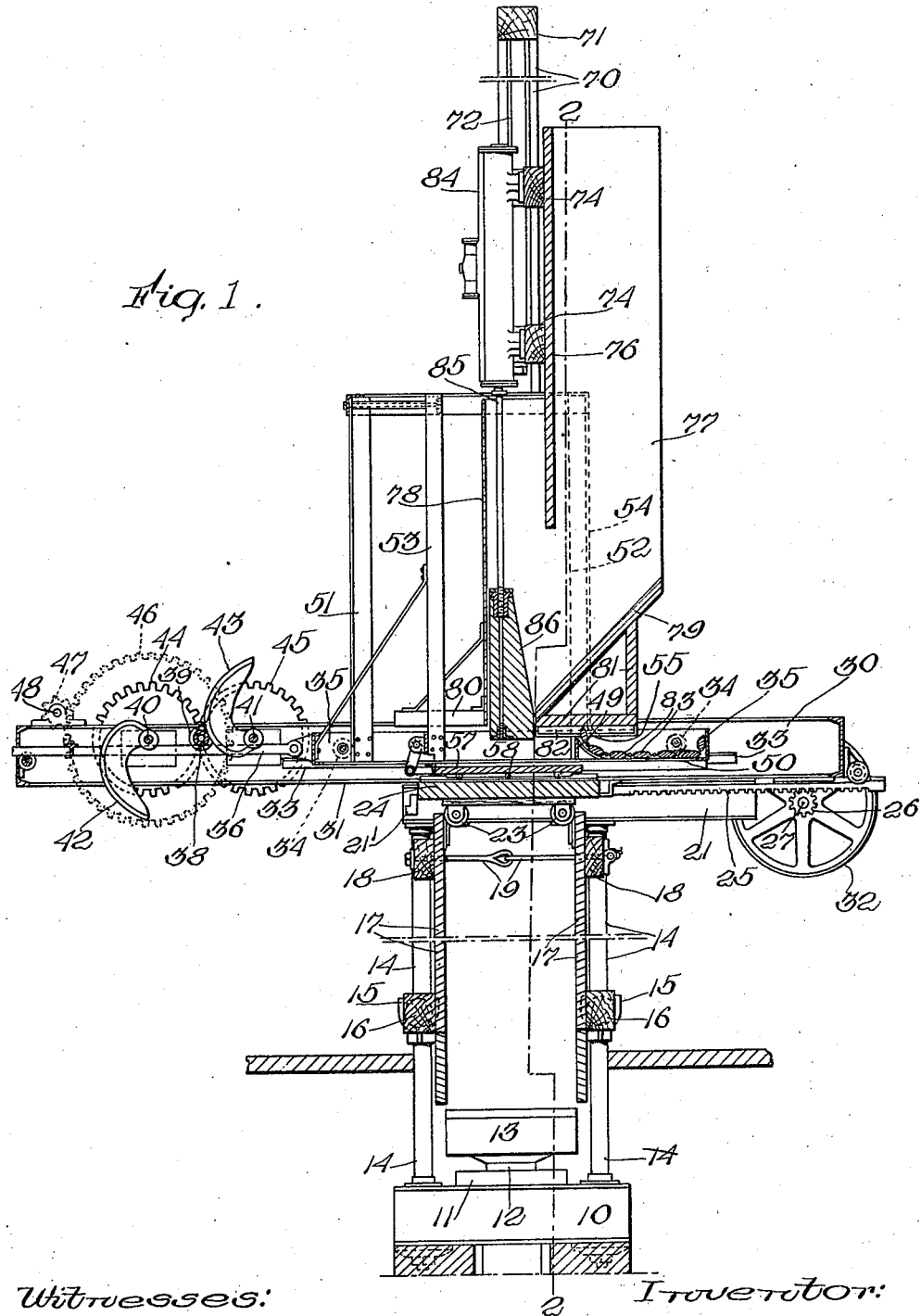
Figure 1, represents a vertical sectional view of the improved cotton tramping and baling machine as taken on line 1—1 Fig. 2.

In carrying this invention into practice it is my purpose first to continuously supply cotton to the tramper and to tramp said cotton as it reaches a suitable point whereby the tramper member or plunger acts against a comparatively small amount of the loose cotton and compresses the same against the more consolidated or condensed cotton previously tramped whereby the air is more readily driven out of the loose cotton and said cotton is more closely packed. During such tramping process the tramping mechanism and certain members of the lint cotton delivery means rides upward, as the height to the bale increases, so that the weight of some of such means or mechanism acts against the compressed cotton.

When the desired amount of cotton lint has thus been tramped and shaped to form the preliminary bale said bale is delivered vertically, and preferably downwardly, into the box of a compressor, of any suitable construction which is adapted to subject the preliminary bale to the pressure found to be necessary or desirable to compress the bale to the predetermined dimensions. While such second, or ultimate, compression of the bale is taking place the tramper mechanism is or may be operating on another supply of the cotton lint.

As shown in the drawings, in its preferred form, 10 is a suitable base or foundation having the guide 11 for the plunger 12 having the head 13 of any well known mechanism for moving said plunger 12 vertically with the desired pressure. Usually this plunger 12 and its head 13 will form part of some hydraulic compressor mechanism which, in itself, forms no part of the present invention. Mounted on the foundation 10 are the standards 14, 14 of any suitable size and strength to sustain the mechanism associated therewith.

Figure 2:
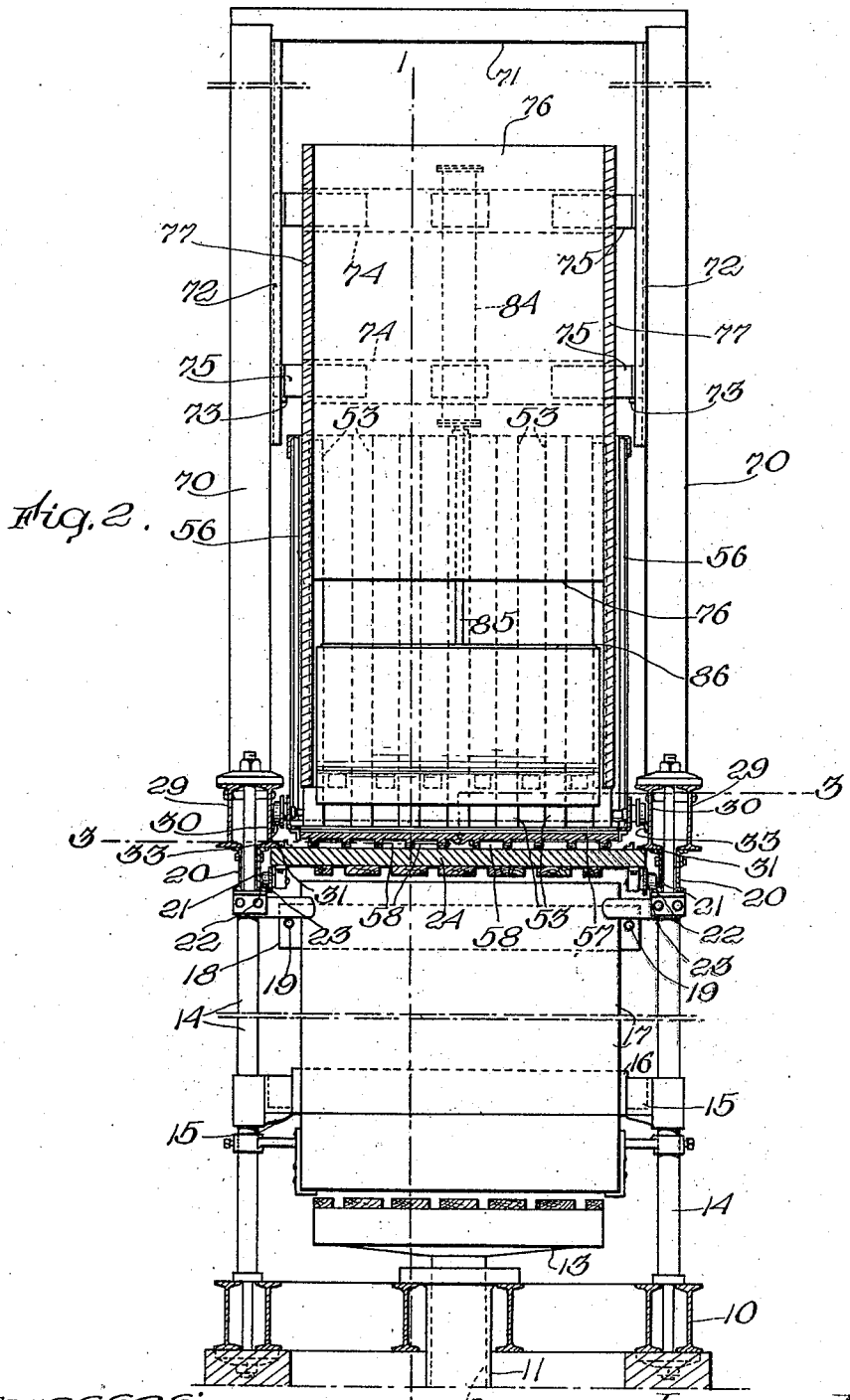
Fig. 2, represents a side elevation of the machine partially in section as on line 2—2 Fig. 1.

The standards 14, 14 have the bearings 15, 15 in which the cross timbers 16, 16 of the side walls 17, 17 of the compressor box are mounted to rotate so that the upper ends of said walls 17, 17 or of one of said walls may be swung outward to permit the removal of a bale. The upper portion of the walls 17, 17 having the members 18, 18 which, when a bale is being compressed, are held from outward movement by the tie rods 19, 19 of any usual and well known construction for such purpose. These tie rods are of course located outside the compressor box and preferably as indicated at 19, 19 Fig. 2. In view of the fact that the bale is formed and compressed to a considerable degree in the tramper or press box the compressor box need not necessarily be provided with vertical walls other than the walls 17, 17.

At the upper portions of the standards 14, 14 are mounted the girder members 20, 20 and 21, 21 securely bolted together of which members 21, 21 have the flanges 22, 22 which form a track for the wheels 23, 23 of the platen 24 which latter is of strong and substantial construction and is adapted to be moved or traversed along said track toward and from stop 21' by means of the racks 25, 25 pivotally connected with said platen and operated by means of the pinions 26, 26 of the shaft 27 which has the balance or hand wheel 28 and is journaled in bearings of the frame girder members 29, 29 and 30, 30 which are firmly secured in place and, preferably, rest on the girder members 20, 20 and 21, 21 respectively in such manner that the flanges 31, 31 of the members 30, 30 extend inward and overlap the upper edge portions of the platen 24 to resist positively the upward movement of said platen against pressure applied therebeneath. In order to operate shaft 27 by power when desired said shaft is supplied with the clutch 32 of any well known construction.

The frame girder members 30, 30 have the rails 33, 33 on which the wheels 34, 34 of the carriage 35 are free to travel. This carriage 35 is caused to move back and forth preferably by the mechanism shown in the drawings in which the tongues 36, 36 pivotally connected with the carriage 35 are supported at their outer ends by the roller bearings 37, 37 of the machine frame and are provided with the shaft 38 having the sleeve 39. Journaled in bearings of the girder members 29 and 30 are the shafts 40 and 41 having respectively the oppositely extending cams 42 and 43 adapted to act alternately on said sleeve 39. Shaft 40 has the gear 44 which drives the gear 45 on shaft 41 and said shaft 41 in a direction opposite to that in which shaft 40 is rotated and motion is transmitted to said shaft 40 through its gear 46 by gear 47 of shaft 48 which is driven in any usual manner.

Carriage 35 has the curved guide 49 having the extension 50 and on said carriage 35 is mounted a frame comprising the uprights 51, 51 and 52, 52 suitably braced and connected and the standards 53, 53 spaced apart while to the uprights 52, 52 are secured the guide plates 54, 54 which at their lower ends are curved as at 55 to correspond with the guide 49 from which said ends are spaced. The ends of the tramper box formed between the standards 53, 53 and the guide plates 54, 54, and the closure device hereinafter described, are defined by the members 56, 56 mounted on said carriage 35 which may be of any usual construction to confine the cotton lint. The base or bottom of this tramper is formed by the platen 57 which has a series of rolls 58, 58 riding on the platen 24. Provision is made to limit the movement of platen 57 in one direction, toward the left hand as shown in the drawings, by mounting the angle iron 59 at the lower portion of carriage 35, whereby a portion of said angle iron extends to a point to intercept said platen 57 and said platen is usually locked to said angle iron by the spring latches as 60 mounted on the sides of said platen and engaging the ends of said angle iron as indicated in Fig. 6. A cross plate 61 has the ears 62, 62 carrying pivoted links 63, 63 at the lower ends of which is the shaft 64 having cam shaped ends which may be brought between the bevel ends of said spring latches as 60 to spread said latches to release them from the ends of said angle iron 59 so that the platen may move away from said angle iron when, in the movement of platen 24, the upstanding member 65 of platen 24 engages platen 57.

Extending upward from the girder members 29, 30 are the guide standards 70, 70 connected at the tops by the cross member 71 and having the guides 72, 72 furnished with the stops 73, 73. Slidable on said guides 72, 72 is a cross head comprising the members 74, 74, 75, 75 which is adapted to be limited in its downward movement by said stops 73, 73. Mounted on the members 74, 74 of said cross head is the vertical wall 76 of the cotton feed chute which has the side walls 77, 77 extending inward between the guides 54, 54, the back wall 78 spaced from said wall 76 and the inclined wall or apron 79 spaced from the lower end of wall 76 whereby cotton lint passing down over said inclined apron 79 may be delivered to the opening between the lower edge of said apron and the wall 78. Securely fastened to the lower portion of wall 78 are several lateral guide arms 80, 80 which extend between the standards 53, 53 and are free to move vertically between said standards which latter are free to move laterally relative to said arms 80, with the carriage 35. Below the apron 79 and fixed thereto is the base member 81 having at its lower end the guides 82, 82 on which is slidable a closure curtain of strong and durable construction comprising the series of bars 83, 83 which are connected together, and to said guides 82, 82 by links so that said bars 83, 83 are free to follow in the space between the curved guides 49 and 55 in the up and down movement of the chute. Said bars 83, 83 are of such length that their ends are overlapped by the guides 54, 54 whereby as the feed chute moves upward said bars close the space between said guides 54, 54 and form one wall of the tramping box.

Mounted on the cross head members 74, 74 is the cylinder 84 which is of any usual construction adapted, when supplied with pressure fluid, to effect the reciprocation of the piston rod 85 having the tramper head 86 which operates to drive downward cotton, supplied from the apron 79, through the opening between said apron and the wall 78 and to compress or consolidate said cotton. Preferably the tramper head 86 is slidably engaged with guides as 87 of the walls 77, 77, see Fig. 3, but I do not desire to limit myself to the particular construction of the tramper or plunger shown herein or to the manner in which it is slidably mounted.

While the baling machine forming the subject matter of this invention is adapted to bale other fiber or material than cotton the machine is especially useful in baling cotton which is delivered to the apron 79 of the feed chute as lint from a condenser or from any suitable feeding device.

When delivered to the apron 79 from a condenser, so called, the cotton fiber is usually extremely loose and light and is in shape somewhat of a lap but such shape or formation is not necessarily maintained and said lap may become folded or distorted in shape in moving down the inclined surface of said apron 79.

In the operation of the machine shaft 48 is driven in any well known manner and motion from said shaft is transmitted through gears 47, 46 to shaft 40 and thence though gears 44, 45 to shaft 41 so that shafts 40 and 41 rotate in opposite directions and their cams 42, 43 act alternately on the sleeve 39 of shaft 38 carried by the arms 36, 36 of carriage 35 to effect the reciprocation of said carriage and the parts mounted thereupon or engaged therewith at the time, which includes the frames having the standards 51 and uprights 52, 53, the latter having the guides 54, and the curtain formed by the bars 83, 83 as the suspending devices at the upper end of said curtain are free to move on their guides 82, 82. Platen 57 is at this time locked to the ends of angle iron 59 by its latches 60 and hence moves with said carriage 35. The preliminary bale forming compartment or press box hence is defined between the sides 56, 56 and the ends formed respectively by the series of uprights 53, 53 and the curtain comprising the bars 83, 83 while the platen 57 forms the bottom of said compartment or box or the resistance means against which the cotton is packed.

Such lateral movement of the tramper box or press box is of course relative to the tramper or plunger 86 and is also relative to the feed chute or cotton delivery but it is evident that such relative movement between said box and the tramper and cotton delivery mechanism be accomplished by effecting the lateral movement of press box, and it is not my intention to limit this portion of my invention except in so far that, preferably, I do effect some lateral relative movement between the press box and one or more of the elements whereby the fiber is delivered to and compressed in said box.

In the machine herein shown, during the reciprocation of the carriage 35 and the parts attached thereto or detachably connected therewith the tramper or plunger 86 is operated vertically with an up and down movement at a suitable speed and under suitable pressure, therefore when said tramper is in its elevated position, shown approximately in Fig. 4, a portion of the cotton lint on the apron 79 may slide downward on to the platen 57 and will receive the impact of tramper 86 on the next downward movement of said tramper. This operation will be repeated during the traverse of the platen 57 and the parts related thereto until a complete layer of cotton has been supplied in comparatively small quantities to said platen and compressed to some extent. On the reverse movement of said platen 57 the same process is repeated and the first layer of cotton will be additionally compressed by the action of tramper 86 on the cotton forming said second layer, and then the preliminary bale will be built up in a succession of layers between the members 53 and the vertical wall of guide 49.

As the cotton is built up on platen 57 said cotton will eventually bear against the bottom of base 81 of the chute or delivery device which therefore will rise with the built up cotton and will bear to some extent on the top of said cotton and tend to compress those portions of the cotton on which it bears so that the cotton is under constant pressure. By reason of the action of the tramper on successive comparatively small charges or amounts of cotton said charges become, to greater extent than heretofore, felted with the adjacent charges so that the preliminary bale, as a whole, is more condensed than heretofore and is less liable to expansion.

After the preliminary bale thus formed has reached the desired height or contains the predetermined amount of cotton it is usual to compress said bale and for such purpose the bale is preferably to be delivered to the compress box and ordinarily the operation of the tramper may cease during such delivery of the preliminary bale which, in this machine, requires but a very short time usually less than a minute.

The walls 17, 17 of the compress box being in the upright position the movement of carriage 35 is arrested with platen 57 in the position shown in Fig. 4. Shaft 64 is now brought between the spring latches 60 of said platen to release said latches from the angle iron 59; power is now applied to rotate shaft 27 whereby the pinion 26, 26 of said shaft act on the racks 25, 25 to draw platen 24 from its position above the compress box and, in such movement, member 65 of said platen 24 engages platen 57 and moves said platen 57 in the same direction thus opening the passage between the press or tramper box and the compressor box. Usually, when said platens 24 and 57 are thus drawn out of its path, the preliminary bale will move downward by gravity, of its own weight and the weight of the chute, but, if necessary, the tramper 86 may be operated to drive downward said preliminary bale between the walls 17, 17 of the compressor box.

The rotation of shaft 27 is now reversed and platens 24 and 57 are moved back to position shown in Figs. 1, 2, 4 and 5 and the latches 60 of platen 57 engage again with angle iron 59 while the edges of platen 24 are located beneath the flanges or members 31, 31 of girder member 30 so that said platen is held against upward pressure. The compressor mechanism or plunger head 13 is now operated in any usual manner to effect the compression of the bale between said head and the under side of the platen 24, the compressed bale is strapped to hold it in shape and said bale is removed by releasing the ties 19, 19 and swinging out the upper end of one of the walls 17 which swinging with its member 16 forms an incline to the floor A, A.

During the operation of the compressor member 13 on the bale between the walls 17, 17 another preliminary bale may be formed above the platen 57 as above described so that the tramping and compressing are practically simultaneous. As soon as one preliminary bale is completed in the tramper said bale is delivered to the compressor and the formation of another preliminary bale is commenced.

Having thus described my invention I claim as new and desire to secure by Letters Patent:

1. A baling machine comprising primary pressing means and secondary pressing means having side walls substantially in vertical alinement whereby the walls of said primary means form a chute adapted to deliver to said secondary means, and means for sustaining material in said primary means.

2. A baling machine comprising primary pressing means and secondary pressing means in substantially vertical alinement, the pressing members thereof operating in opposite directions, and means coöperating with the respective pressing members to resist movement of material under pressure.

3. A baling machine comprising coöperating means for sustaining and confining material, a gravity pressure device, means for delivering material, and tramping means adapted to operate on material as delivered.

4. A baling machine comprising coöperating means for sustaining and confining material, a gravity pressure device, means for delivering material adjacent said pressure device, intermittently acting means for compressing a portion of material below the level of said gravity pressure device, and means for effecting relative movement between said gravity pressure device and the main portion of compressed material.

5. A baling machine comprising coöperating means for sustaining and confining material, a gravity pressure device, means for delivering material adjacent said pressure device, intermittently acting means for compressing said material as delivered, and means for effecting relative movement between said confining means and both of said pressure devices.

6. A baling machine comprising coöperating means for sustaining and confining material, a gravity pressure device having a free upward movement, means for delivering material adjacent said pressure device, and an intermittently acting pressure device mounted on said gravity pressure device.

7. A baling machine comprising coöperating means for sustaining and confining material, a gravity pressure device, an intermittently acting pressure device reacting to move the gravity pressure device, and means for delivering material to said intermittent device.

8. A baling machine comprising coöperating means for sustaining and confining material, a gravity pressure device, an intermittently acting pressure device reacting to move the gravity pressure device, means for delivering material to said intermittent device, and means for effecting relative lateral movement between the main body of material and both of said pressure devices.

9. A baling machine comprising coöperating means for sustaining and confining material, a gravity pressure device, having a food chute, an intermittently acting pressure device operating adjacent said chute and adapted through its operation to effect the intermittent lifting of said gravity pressure device, and means for effecting continuous back and forth movement of the main body of material.

10. A baling machine comprising vertical means for confining material, sustaining means mounted for movement out of its sustaining position, a vertically movable gravity pressure device having means for delivering material within said confining means, an intermittently acting pressure device operating in conjunction with said gravity pressure device, and a receptacle for the compressed material located below said sustaining device.

11. A baling machine comprising vertical means for confining material of which one wall is vertically movable, and means adapted to ride upward on the compressed material for sustaining said wall.

12. A baling machine comprising vertical means for confining material of which one wall is vertically movable, and a gravity pressure device adapted to ride on the compressed material for effecting movement of said wall.

13. A baling machine comprising vertical means for confining material of which one wall is vertically movable, means for progressively moving said wall relative to the height of the compressed material, a member adapted to ride on the surface of the compressed material to which the upper end of said wall is attached, an intermittently operating pressure device operating always relative to the progression of the compressed material, and means for delivering material to said pressure device.

14. A baling machine comprising vertical means for confining material of which one wall is movable, laterally movable guides by means of which said wall is sustained, means to deliver material relative to the height of said movable wall, a pressure member, and means for effecting relative movement between said confining means and said delivery means.

15. A baling machine comprising vertical means for confining material including a vertically movable wall member, means adapted to ride on the surface of the compressed material for sustaining said wall without restricting its lateral movement, a pressure device, means for delivering material thereto, and means for effecting relative movement between said confining means and said pressure device.

16. A baling machine comprising vertical means for confining material, one wall of which has a pair of rigid standards, and a confining member slidable relative to such standards, a material delivery device extending between said standards and adapted to sustain said slidable member, and a pressure device.

17. A baling machine comprising vertical means for confining material one wall of which has a pair of rigid standards and a confining member slidable relative to said standards, a material delivery device extending inward between said standards and having means for slidably sustaining said slidable confining member, a pressure device, and means for effecting relative movement between said confining means and said delivery device.

18. A baling machine comprising vertical means for confining material one wall of which has a pair of rigid standards forming guides, a curtain having a series of cross bars slidable in said guides, a delivery device extending between said standards and having means for effecting movement of said curtain, and a pressure device.

19. A baling machine comprising vertical means for confining material one wall of which has an opening, slidable means for closing said opening, a delivery device extending through said opening and adapted to ride on the surface of the compressed material and having means for effecting movement of said slidable means, a plunger operating in conjunction with said delivery device, and means for effecting relative lateral movement between said confining means and said delivery device and plunger.

20. A baling machine comprising vertical means for confining material one wall of which has a pair of standards forming guides, a delivery chute extending between said guides and having a wall which with the lower portion of said chute defines a mouth, a plunger operating through said mouth, a closure slidable between said guides and connected with members of said chute, and means for effecting relative movement between said confining means and said chute.

21. A baling machine comprising vertical means for confining material one wall of which has a pair of standards forming guides, a delivery chute extending between said guides and having a wall which with the lower portion of said chute defines a mouth, a plunger operating through said mouth, a closure slidable between said guides and connected with members of said chute, guides extending from said wall of said chute and slidable relative to one wall of said confining means, and means for effecting relative movement between said confining means and said chute.

22. A baling machine comprising confining means having a pair of walls of which one has a series of vertical standards spaced apart and the other has a pair of guides defining an opening, a slidable closure for said opening, a chute extending through said opening to members of which said closure is connected, said chute having side walls and an end wall, a plunger and plunger operating mechanism carried by members of said chute, said plunger operating through an opening between said end wall and said chute, said end wall having laterally extending arms slidably engaged between the standards of the adjacent wall of said confining means, and means for effecting relative movement between said confining means and said chute and plunger.

23. A baling machine comprising horizontal tracks, a carriage movable on said track, vertical guides at the sides of said track, vertical confining means mounted on said carriage, a chute having members slidable in said guides, a tramper mechanism carried by said chute, a sustaining means below said tramper, and means for effecting relative movement between said carriage and said guides.

24. A baling machine comprising a horizontal track, a carriage movably mounted on said track, vertical guides fixed at the sides of said track, a series of vertical standards on said carriage, two of which are spaced apart, a chute extending between said spaced standards and having members guided by said guides, a tramper mechanism mounted on said chute, a curtain carried by said chute and comprising a series of bars which with said spaced standards form a confining wall, and a sustaining means below said tramper.

25. A baling machine comprising a horizontal track, a carriage movably mounted on said track, a sustaining platen movably mounted, means for locking said platen to said carriage, a series of spaced vertical standards on said carriage forming a wall, a pair of vertical standards spaced from each other and from said wall, guides fixed to the sides of said track, a chute having members guided by said guides, a tramper mechanism mounted on said chute, and a curtain having transverse rigid members carried by said chute and adapted to be engaged by said pair of standards when said chute moves upward.

26. A baling machine comprising a horizontal track, a carriage movably mounted on said track, a sustaining platen movably mounted, means for locking said platen to said carriage, a series of spaced vertical standards on said carriage forming a wall, a pair of vertical standards spaced from each other and from said wall, guides fixed to the sides of said track, a chute having members guided by said guides, a tramper mechanism mounted on said chute, and a curtain having transverse rigid members carried by said chute and adapted to be engaged by said pair of standards when said chute moves upward, said carriage having a fixed member between which and said wall the formation of a bale may be commenced.

27. A baling machine comprising a horizontal track, a carriage movably mounted on said track, means to reciprocate said carriage, a platen movably mounted relative to said carriage, means for locking said platen to said carriage, means for, at times, moving said platen relative to said carriage, progressively operating means for building up a bale of material on said platen, and a bale receptacle located below said platen.

28. A baling machine comprising a horizontal track, a carriage movably mounted on said track, means to reciprocate said carriage, a platen movably mounted relative to said carriage, means for locking said platen to said carriage, means for, at times, moving said platen relative to said carriage, confining means mounted on said carriage, a vertically movable chute fixed relative to the reciprocation of said carriage, a tramper mechanism mounted on said chute, and a bale receptacle located below said platen.

29. A baling machine comprising a horizontal track, a carriage movably mounted on said track, means to reciprocate said carriage, a platen movably mounted relative to said carriage, means for locking said platen to said carriage, means for, at times, moving said platen relative to said carriage, confining means mounted on said carriage, a vertically movable chute fixed relative to the reciprocation of said carriage, a tramper mechanism mounted on said chute, and a bale compressor located below said platen adapted to receive a bale from said confining means when said platen is moved out of its sustaining position.

30. A baling machine comprising a horizontal track, a carriage movable on said track, means for reciprocating said carriage, a bale forming frame mounted on said carriage, a tramper mechanism therefor, a second track, a platen movably mounted on said second track, a second platen movably mounted on said first platen, means for effecting the movement of said second platen with said carriage, a bale compressor located below said platens of which said first mentioned platen forms a member.

31. A baling machine comprising a horizontal track, a carriage movable on said track, means for reciprocating said carriage, a bale forming frame mounted on said carriage, a tramper mechanism therefor, a second track, a platen movably mounted on said second track, a second platen movably mounted on said first platen, means for effecting the movement of said second platen with said carriage, a bale compressor located below said platens of which said first mentioned platen forms a member, and means for positively resisting the upward movement of said first mentioned platen.

32. A baling machine comprising a horizontal track, a carriage movable on said track, means for reciprocating said carriage, a bale forming frame mounted on said carriage, a tramper mechanism therefor, a second track, a platen movably mounted on said second track and adapted to be resisted as to its upward movement by members of said first track, a second platen movable on said first platen and having means to engage a member of said carriage, means for moving both of said platens from beneath said bale forming frame, and a compressor box located below said platens of which said first mentioned platen forms a thrust resisting member when said first platen is positioned thereabove.

33. A baling machine comprising a pair of independent superposed pressure members mounted for movement out of their pressure resisting positions, duplex pressure applying means coöperating with said pressure members, and means for confining material to which pressure is to be applied.

34. A baling machine comprising primary pressing means and secondary pressing means substantially in vertical alinement and having superposed pressure resisting members, and pressure members in said respective pressing means.

35. A baling machine comprising primary pressing means for progressively building up a bale by pressing the constituents thereof, and a secondary pressing means, said pressing means having independently movable pressure resisting members associated to resist pressure in two directions.

36. A baling machine comprising means for confining material, independent means for sustaining material, a pressure device, a secondary pressing means adapted to receive partially pressed material from said confining means, and a pressure resisting member for said secondary means having provision to support said sustaining means.

37. A baling machine comprising a primary pressing means and a secondary pressing means in substantially vertical alinement, and superposed pressure resisting members for said respective pressing means adapted to be moved laterally out of position.

PEARL K. CROWELL.

Witnesses:
 HENRY J. MILLER,
 ESTHER C. MURPHY.

Copies of this patent may be obtained for five cents each, by addressing the "Commissioner of Patents, Washington, D. C."